United States Patent
Ozawa

(10) Patent No.: US 6,476,819 B1
(45) Date of Patent: Nov. 5, 2002

(54) APPARATUS AND METHOD FOR ASSIGNING SHRINKAGE FACTOR DURING TEXTURE MAPPING OPERATIONS

(75) Inventor: Hiroyuki Ozawa, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/443,556

(22) Filed: Nov. 18, 1999

(30) Foreign Application Priority Data

Nov. 20, 1998 (JP) .......................................... 10-331499

(51) Int. Cl.$^7$ ............................................. G06T 11/40
(52) U.S. Cl. ....................................................... 345/587
(58) Field of Search ................................. 345/582, 587, 345/606–609

(56) References Cited

U.S. PATENT DOCUMENTS 5,222,205 A * 6/1993 Larson et al. ............... 345/587
5,307,450 A * 4/1994 Grossman ................... 345/582
5,651,104 A * 7/1997 Cosman ...................... 345/428
6,204,857 B1 * 3/2001 Piazza et al. ............... 345/582

\* cited by examiner

*Primary Examiner*—Jeffery Brier
(74) *Attorney, Agent, or Firm*—Fulwider Patton Lee & Utecht, LLP

(57) ABSTRACT

The present invention provides a picture processing apparatus and method comprising a displacement computing unit which computes displacements in a UV coordinate system of a 2-dimensional picture texture to be pasted on a multi-dimensional figure from displacements in a texture coordinate system of the figure and an XY coordinate system onto which the figure is mapped and supplies the computed displacements to a displacement adjusting unit for adjusting the displacements by multiplying them by adjustment coefficients to produce adjusted displacements which are then supplied to a shrinkage-factor computing unit for computing a shrinkage factor to be used as a shrinkage factor of MIPMAP filtering.

8 Claims, 5 Drawing Sheets

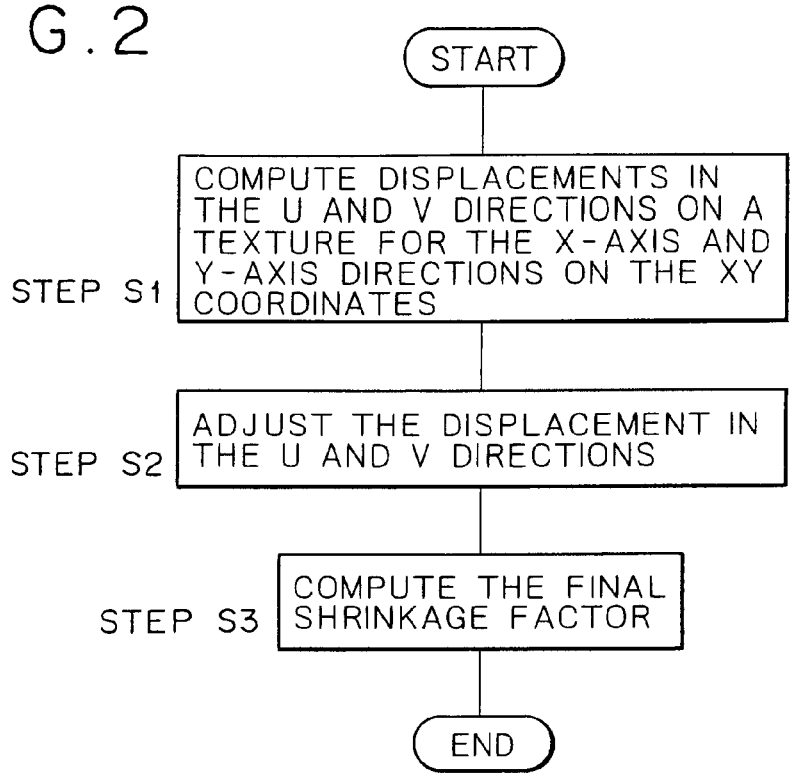
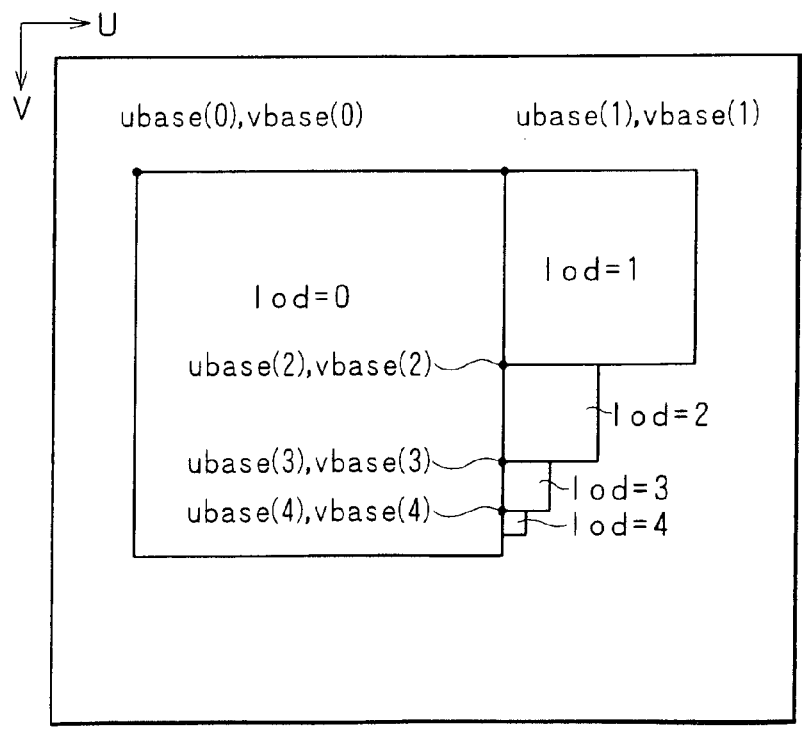

NON-INTERLACE PICTURE n LINES

INTERLACE PICTURE n/2 LINES

PICTURE WITH NO BIASES IN THE X-AXIS AND Y-AXIS DIRECTIONS

PICTURE WITH BIASES IN THE X-AXIS AND Y-AXIS DIRECTIONS

APPARATUS AND METHOD FOR ASSIGNING SHRINKAGE FACTOR DURING TEXTURE MAPPING OPERATIONS

BACKGROUND OF THE INVENTION

In general, the present invention relates to a texture mapping apparatus for carrying out texture mapping adopted as a technique to drastically improve the expression power of a multidimensional computer graphic system. More particularly, the present invention relates to a picture processing apparatus and a method thereof capable of preventing generation of aliasing and excessive resolution deterioration of a picture, and hence, capable of providing high-quality texture mapping by assigning a proper shrinkage factor when pasting a texture of a 2-dimensional picture on a multidimensional figure. In addition, the present invention can be applied to a wide range of applications such as the CAD (Computer Aided Design), designing work and games.

Texture mapping is a technique of pasting a 2-dimensional picture provided in advance on the surface of a figure in an operation to render the figure by means of computer graphics. Such a 2-dimensional picture is referred to hereafter as a texture. By adopting the texture-mapping technique, a high-quality picture can be obtained.

In order to make the following description easy to understand, the basic principle of the texture-mapping technique is briefly explained by referring to FIGS. 8A, 8B, 9A and 9B. FIG. 8A is a diagram showing a figure, on which a texture is to be pasted, and a coordinate system onto which the figure is mapped. The coordinate system is referred to hereafter as an XY coordinate system 81.

A triangle 80 represents a polygon. A figure to be rendered is created as a set of a plurality of triangles. 3-dimensional coordinates Sn, Tn and Qn where n=1, 2 and 3 are assigned to the vertexes A, B and C of the triangle 80 respectively. Such 3-dimensional coordinates are referred to hereafter as texture coordinates. A figure for the texture coordinates is omitted. Thus, FIG. 8A is a diagram showing the triangle 80 which is expressed in the texture coordinate system and mapped onto the XY coordinate system 81. Coordinates (s, t, q) of a point D inside the triangle 80 are obtained by linear interpolation of the texture coordinates Sn, Tn and Qn where n=1, 2 and 3 of the vertexes A, B and C.

Texture coordinates such as the coordinates (s, t, q) and (Sn, Tn, Qn) described above are assigned to each of individual triangles constituting a figure being rendered. Thus, the texture coordinates are variables. In addition, the texture coordinates Sn, Tn and Qn where n=1, 2 and 3 assigned to the vertexes A, B and C of the triangle 80 correspond to XY coordinates (X, Y) whereas the texture coordinates (s, t, q) assigned to a pixel inside the triangle 80 correspond to XY coordinates (x, y).

On the other hand, FIG. 8B is a diagram showing a 2-dimensional coordinate system of a texture to be pasted on the figure to be rendered as described above. The 2-dimensional coordinate system is referred to as a UV-coordinate system 82. A texture triangle 83 is a triangle constituting a texture to be pasted on the triangle 80. The points (A, B, C and D) mapped onto the XY-coordinate system 81 are associated with the points (A', B', C' and D') of the texture triangle 83 to be posted.

A texture is initially given on the UV coordinate system 82 as a 2-dimensional picture. The texture is then subjected to operations such as a rotation and a movement and finally mapped onto the XY coordinate system 81. The UV coordinates of the points (A', B', C' and D') of the texture triangle 83 are expressed in terms of texture coordinates (sn, Tn, Qn where n=1, 2 and 3) and (s, t, q) described above as shown in FIG. 8B.

In addition, FIGS. 9A and 9B are diagrams showing what displacement on the UV coordinate system 82 a component displacement dx of a unit pixel on the XY coordinate system 81 in the X-axis direction corresponds to. As shown in the figure, the component displacement dx in the XY coordinate system 81 corresponds to a component displacement dudx in the U-axis direction and a component displacement dvdx in the V-axis direction on the UV coordinate system 82. Thus, the component displacement dx on the XY coordinate system 81 corresponds to a resultant displacement $e=\{(dudx)^2+(dvdx)^2\}^{1/2}$ on the UV coordinate system 82. This explanation is also applicable to a component displacement dy in the y-axis direction on the XY coordinate system 81. dudx described above is a coordinate value of a displacement in the u direction in the UV coordinate system 82 for the change dx in the XY coordinate system 81. Notation q·q to be used frequently later means processing to multiply q by q where the symbol q represents any quantity. In order to avoid complexity of the explanation, notation q·q is used hereafter.

A MIPMAP filtering technique (Multum In Parvo Mapping) is known as a method to obtain a high-quality picture in a texture mapping process. The MIPMAP filtering technique is described in detail with reference to, such as a publication of Addison Wesley entitled "Advanced Animation and Rendering Techniques," page 140.

The MIPMAP filtering technique is described by referring to FIGS. 5, 6A, 6B, 7A and 7B as follows.

In order to avoid aliasing caused by information which is dropped when a texture is shrunk and pasted as shown in FIG. 5, according to the MIPMAP filtering technique, a plurality of textures completing a filtering process according to the shrinkage factor are prepared in advance. In the example shown in FIG. 5, the textures are the original picture, a half picture, a one-fourth picture and a one-eighth picture. One of the textures is to be selected in accordance with the shrinkage factor of pixels. The reason why pictures with compression factors different from each other are prepared in advance is to reduce a load to be borne during the filtering process of the picture.

The texture mapping process adopting the ordinary MIPMAP filtering technique is described as follows.

1) Texture coordinates (S1, T1, Q1), (S2, T2, Q2) and (S3, T3, Q3) are assigned to the three vertexes of the triangle, respectively.

2) Texture coordinates (s, t, q) of each pixel inside the triangle are found by linear interpolation of the texture coordinates (S1, T1, Q1), (S2, T2, Q2) and (S3, T3, Q3) assigned to the three vertexes.

3) The shrinkage factor lod of each pixel inside the triangle is found by using the texture coordinate (s, t, q)

4) Coordinates U=s/q and V=t/q in the UV coordinate system 82 for each pixel inside the triangle are computed.

5) A texture for a given shrinkage factor lod is selected from a plurality of textures prepared in advance. Each position inside a selected texture is referenced by using the coordinates (U, V) in the UV coordinate system 82.

The shrinkage factor lod of the texture described above indicates how much the original picture is shrunk in the texture mapping process. Different lod values are set for different shrinkage factors as follows.

| Shrinkage factor | lod value |
| --- | --- |
| 1/1 | lod = 0 |
| 1/2 | lod = 1 |
| 1/4 | lod = 2 |
| 1/8 | lod = 3 |
| . | |
| . | |
| . | |
| 1/n | lod = $\log_2$ (n) |

As an example, the following description explains how to compute the value of lod at texture coordinates (s, t, q) in the triangle, a subject figure to be rendered. In the figure, notations dsdx, dtdx and dqdx denote displacements of s, t and q in the X-axis direction respectively. By the same token, notations dsdy, dtdy and dqdy denote displacements of s, t and q in the Y-axis direction, respectively.

1) Component displacements in the U-axis and V-axis directions of the texture in the UV coordinate system 82 for component displacements dx and dy of a unit pixel in the X-axis and Y-axis directions on the XY coordinate system 81 are found by using Eqs. (1) as follows.

$$dudx = (s \cdot dqdx - q \cdot dsdx)/q \cdot q$$

$$dvdx = (t \cdot dqdx - q \cdot dtdx)/q \cdot q$$

$$dudy = (s \cdot dqdy - q \cdot dsdy)/q \cdot q$$

$$dvdy = (t \cdot dqdy - q \cdot dtdy)/q \cdot q \quad (1)$$

2) Resultant displacements in the U-axis and V-axis directions of the texture in the UV coordinate system 82 for resultant displacements of the component displacements dx and dy of a unit pixel in the X-axis and Y-axis directions on the XY coordinate system 81 are found by applying the Pitagoras theorem to the component displacements expressed by Eqs. (1) as follows.

$$ex = \{(dudx)^2 + (dvdx)^2\}^{1/2} \text{(in the U direction)}$$

$$ey = \{(dudy)^2 + (dvdy)^2\}^{1/2} \text{(in the V direction)} \quad (2)$$

3) A maximum value of the displacement of the texture in the UV coordinate system 82 for component displacements dx and dy of a unit pixel in the X-axis and Y-axis directions on the XY coordinate system 81 is found by using Eqs. (3) as follows.

$$e = \max(ex, ey) \quad (3)$$

The meaning of Eq. (3) is that e=ex for ex>ey, otherwise, e=ey.

The value of the shrinkage factor lod is computed as a $\log_2$ function of e found by Eq. (3) as follows:

$$lod = \log_2 (e) \quad (4)$$

In the technique to compute the shrinkage factor lod of a texture described above, there presents no problem when a pixel to be rendered is a rectangle. In FIG. 6A a non-interlace picture is shown. In a video signal performing interlaced scanning, such as in an interlace rendering operation as shown in FIG. 6B, however, the resolution in the Y direction of the picture to be rendered is reduced to a half, so that the ratio of horizontal pixels to vertical pixels becomes equal to 2:1. As a result, displacements in the U-axis and V-axis directions for a movement in the Y-axis direction are twice as much as displacements in the U-axis and V-axis directions for a movement in the X-axis direction. Thus, Eq. (3) satisfies e=ey and the shrinkage factor lod is strongly affected by a displacement in the Y-axis direction, becoming a large value in comparison with a non-interlace rendering operation. As a MIPMAP filtering technique shown in FIG. 5, a picture with a high shrinkage factor and a low frequency is selected, raising a problem that a picture thus generated becomes improper and excessively fading/dim in the X-axis direction. A picture with no biases in the X-axis and Y-axis directions is shown in FIG. 7A.; and In addition, in a perspective projection where a picture is biased in the horizontal and/or vertical direction as shown in FIG. 7B, the picture is affected also in the biased direction to result in a large shrinkage factor. As a result, there is raised a problem of an excessively fading picture.

SUMMARY OF THE INVENTION

It is thus an object of the present invention addressing the problems described above to provide a picture processing apparatus and a picture processing method which are capable of preventing an excessively fading picture from being generated in, among others, the case of an interlace rendering operation or a perspective projection biased in the horizontal and/or vertical directions.

In order to achieve the object described above, according to a first aspect of the present invention, there is provided a picture processing apparatus wherein a plurality of 2-dimensional pictures with shrinkage factors different from each other are stored in a memory, one of the 2-dimensional pictures is selected from the memory in accordance with contents of a multidimensional figure to be pasted on the multidimensional figure and the multidimensional figure with the selected 2-dimensional picture pasted thereon is mapped onto a first 2-dimensional coordinate system, the picture processing apparatus comprising: a displacement computing means for computing a plurality of displacements of the 2-dimensional picture on a second 2-dimensional coordinate system prescribing the 2-dimensional picture from multidimensional coordinates of a point inside a triangle constituting the multidimensional figure and a plurality of unit displacements of the point inside the triangle on the first 2-dimensional coordinate system onto which the triangle is mapped; a displacement adjusting means for adjusting the computed displacements of the 2-dimensional picture independently of each other by multiplying the computed displacements at least by numbers; and a shrinkage-factor computing means for computing a shrinkage factor of the 2-dimensional picture to be pasted on the multidimensional figure from the adjusted displacements of the 2-dimensional picture.

According to another aspect of the present invention, there is provided a picture processing method by which a plurality of 2-dimensional pictures with shrinkage factors different from each other are stored in a memory, one of the 2-dimensional pictures is selected from the memory in accordance with contents of a multidimensional figure to be pasted on the multidimensional figure and the multidimensional figure with the selected 2-dimensional picture pasted thereon is mapped onto a first 2-dimensional coordinate system, the picture processing method comprising the steps of: computing a plurality of displacements of the 2-dimensional picture on a second 2-dimensional coordinate system prescribing the 2-dimensional picture from multidimensional coordinates of a point inside a triangle constituting the multidimensional figure and a plurality of unit displacements of the point inside the triangle on the first 2-dimensional coordinate system onto which the triangle is mapped; adjusting the computed displacements of the 2-dimensional picture independently of each other by multiplying the computed displacements at least by numbers; and computing a shrinkage factor of the 2-dimensional picture to be pasted on the multidimensional figure from the adjusted displacements of the 2-dimensional picture.

As described above, a displacement computing means is used for computing a plurality of displacements of a 2-dimensional picture on a second 2-dimensional coordinate system prescribing the 2-dimensional picture from multidimensional coordinates of a point inside a triangle constituting a multidimensional figure and a plurality of unit displacements of the point inside the triangle on the first 2-dimensional coordinate system onto which the triangle is mapped; a displacement adjusting means is used for adjusting the computed displacements of the 2-dimensional picture independently of each other by multiplying the computed displacements at least by numbers; and a shrinkage-factor computing means is used for computing a shrinkage factor of the 2-dimensional picture to be pasted on the multidimensional figure from the adjusted displacements of the 2-dimensional picture.

As a result, with the configuration of the picture processing apparatus and a method thereof according to the present invention, since a MIPMAP filtering process can be carried out by controlling the magnitude of the shrinkage factor, it is possible to suppress generation of an excessively fading picture obtained as a result of interlace rendering or a perspective projection biased in the horizontal and/or vertical direction.

BRIEF DESCRIPTION OF THE DRAWINGS

FIG. 2 shows a flowchart representing processing carried out by the texture shrinkage-factor computing unit implemented by the embodiment shown in FIG. 1;

FIG. 3 is an explanatory diagram showing a state of storing textures with different shrinkage factors in a texture memory;

DETAILED DESCRIPTION OF THE PREFERRED EMBODIMENTS

Some preferred embodiments implementing a texture mapping unit provided by the present invention are described by referring to FIGS. 1 to 4 as follows.

Figure 1:
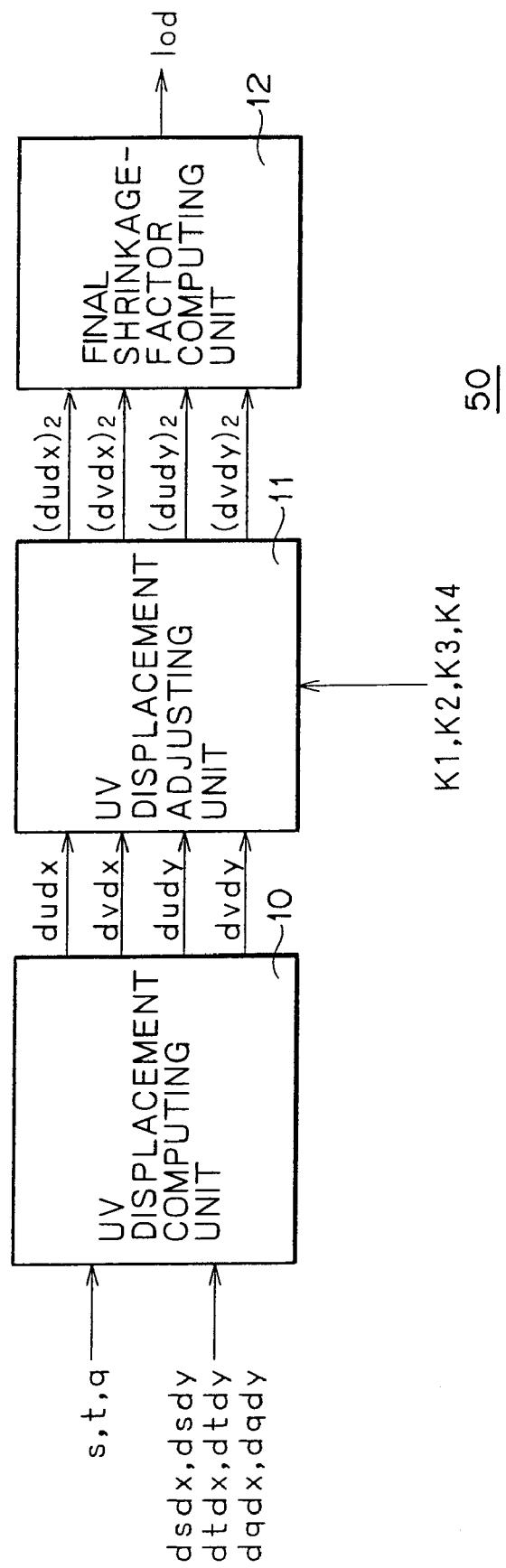
FIG. 1 is a schematic diagram showing an embodiment implementing a shrinkage-factor computing unit employed in a texture mapping unit and used for computing a shrinkage factor of a texture.

FIG. 1 is a schematic diagram showing an embodiment implementing a shrinkage-factor computing unit 50 for computing a shrinkage factor of a texture. The shrinkage-factor computing unit 50 is embedded in a texture mapping unit 43 shown in FIG. 4. A shrinkage factor of a texture is computed in a texture-mapping operation carried out by the texture mapping unit 43. As shown in FIG. 1, the texture shrinkage-factor computing unit 50 comprises a UV displacement computing unit 10, a UV displacement adjusting unit 11 and a final shrinkage-factor computing unit 12. The UV displacement computing unit 10 computes displacements (dudx, dvdx, dudy, dvdy) of a texture in the U-axis and V-axis directions on the UV coordinate system 82 for component displacements dx and dy of a unit pixel in the X-axis and Y-axis directions on the XY coordinate system 81 of a figure to be rendered. The UV displacement adjusting unit 11 independently adjusts the displacements computed by the UV displacement computing unit 10. The final shrinkage-factor computing unit 12 computes a final shrinkage factor by using the independently adjusted displacements. Thus, the shrinkage-factor computing unit 50 computes a final shrinkage factor by controlling displacements (dudx, dvdx, dudy, dvdy) of a texture in the U-axis and V-axis directions on the UV coordinate system 82 independently of each other for displacements of a unit pixel in the X-axis and Y-axis directions on the XY coordinate system 81 of a figure to be rendered. The computed shrinkage factor is supplied to a MIPMAP filtering unit (FIG. 5) for carrying out a MIPMAP filtering process as explained earlier with reference to FIG. 5.

FIG. 2 shows a flowchart representing processing carried out by the textured shrinkage-factor computing unit 50 employed in the texture mapping unit 43 provided by the present invention to compute a shrinkage factor. The processing to compute a shrinkage factor is explained by referring to the flowchart shown in FIG. 2 and the configuration of the texture shrinkage-factor computing unit 50 shown in FIG. 1 in a simple plan manner as follows.

As shown in FIG. 2, the flowchart begins with a step S1 at which the UV displacement computing unit 10 shown in FIG. 1 computes displacements of a texture in the U-axis and V-axis directions on the UV coordinate system 82 for component displacements dx and dy of a unit pixel in the X-axis and Y-axis directions on the XY coordinate system 81. The displacements (dudx, dvdx, dudy, dvdy) of a texture in the U-axis and V-axis directions on the UV coordinate system 82 for component displacements dx and dy are expressed by Eqs. (5) which are Eqs. (1) with comments added thereto.

The displacement in the U-axis direction for the displacement dx in the X-axis direction:

$$dudx=(s \cdot dqdx-q \cdot dsdx)/q \cdot q$$

The displacement in the V-axis direction for the displacement dx in the X-axis direction:

The displacement in the U-axis direction for the displacement dy in the Y-axis direction:

$$dudy=(s \cdot dqdy-q \cdot dsdy)/q \cdot q$$

The displacement in the V-axis direction for the displacement dy in the Y-axis direction:

$$dvdy=(t \cdot dqdy-q \cdot dtdy)/q \cdot q \qquad (5)$$

where notations (s, t, q) are texture coordinates of a unit pixel inside the triangle, notations dsdx, dtdx and dqdx are displacements of the texture coordinates s, t and q in the X-axis direction respectively whereas notations dsdy, dtdy and dqdy are displacements of the texture coordinates s, t and q in the Y-axis direction, respectively.

It should be noted that Eqs. (5) merely represent a typical method for computing displacements in the U-axis and V-axis directions. That is to say, displacements in the U-axis and V-axis directions can also be computed by using an approximation formula to Eqs. (5) or a simplified equation. For example, the displacement of the coordinate q is assumed so small to be ignored, so that displacements in the U-axis and V-axis directions can be computed by setting dqdx=dqdy=0 to reduce a burden of computing.

Then, at a step S2 of the flowchart shown in FIG. 2, the UV displacement adjusting unit 11 shown in FIG. 1 adjusts the displacements (dudx, dvdx, dudy, dvdy) in the U-axis and V-axis directions. As a typical adjustment of the displacements (dudx, dvdx, dudy, dvdy) in the U-axis and V-axis directions, the displacements (dudx, dvdx, dudy, dvdy) in the U-axis and V-axis directions found by the displacement computing unit 10 by using Eqs. (5) are converted into newly adjusted displacements $(dudx)_2$, $(dvdx)_2$, $(dudy)_2$ and $(dvdy)_2$ in the U-axis and V-axis directions by using Eqs. (6) as follows:

$$(dudx)_2 = k1 \cdot dudx$$

$$(dvdx)_2 = k2 \cdot dvdx$$

$$(dudy)_2 = k3 \cdot dudy$$

$$(dvdy)_2 = k4 \cdot dvdy \quad (6)$$

where notations k1 to k4 are coefficients for adjusting the displacements in the U-axis and V-axis directions. The displacements in the U-axis and V-axis directions are adjusted by being given values for k1 to k4 in Eqs. (6). As an example, in the case of an interlace picture, by using k1=1, k2=1, k3=0.5 and k4=0.5, the displacements (dudx, dvdx, dudy, dvdy) in the U-axis and V-axis directions for a displacement in the Y-axis direction can be suppressed.

In addition, in case an excessively fading picture is generated in a perspective projection biased in the horizontal and/or vertical direction, the degree of fading can be reduced by setting k1=k2=k3=k4=0.8. As described above, the coefficients k1 to k4 can be set at values appropriate for the figure to be rendered.

Then, at a step S3 of the flowchart shown in FIG. 2, the final shrinkage-factor computing unit 12 shown in FIG. 1 computes a final shrinkage factor. A final shrinkage factor lod is calculated typically by using Eq. (7) shown below from the adjusted displacements $(dudx)_2$, $(dvdx)_2$, $(dudy)_2$ and $(dvdy)_2$ in the U-axis and V-axis directions obtained as a result of an adjustment carried out by the UV displacement adjusting unit 11 using Eqs. (6).

$$lod = \log_2(e_2) \quad (7)$$

where $ex_2 = \{((dudx)_2)^2 + ((dvdx)_2)^2\}^{1/2}$ $ey_2 = \{((dudy)_2)^2 + ((dvdy)_2)^2\}^{1/2}$, and $e_2 = \max(ex_2, ey_2)$ As described above, after the UV displacement computing unit 10 shown in FIG. 1 computes displacements of a texture in the U-axis and V-axis directions on the UV coordinate system 82 for component displacements dx and dy of a unit pixel in the X-axis and Y-axis directions on the XY coordinate system 81 and the UV displacement adjusting unit 11 adjusts the displacements (dudx, dvdx, dudy, dvdy) in the U-axis and V-axis directions independently of each other, the final shrinkage-factor computing unit 12 computes a final shrinkage factor lod from the adjusted displacements $(dudx)_2$, $(dvdx)_2$, $(dudy)_2$ and $(dvdy)_2$ in the U-axis and V-axis directions obtained as a result of the independent adjustment. It should be noted that Eq. (7) is no more than a typical calculation means. That is to say, a final shrinkage factor can also be computed by using an approximation formula to Eq. (7) or a simplified equation.

As described above, the texture shrinkage-factor computing unit 50 comprises a UV displacement computing unit 10, a UV displacement adjusting unit 11 and a final shrinkage-factor computing unit 12, carrying out signal processing based on Eqs. (5) through (7). It should be noted that the texture shrinkage-factor computing unit 50 can also be implemented by a software control means comprising a CPU for executing a program representing the signal processing described above.

Figure 4:
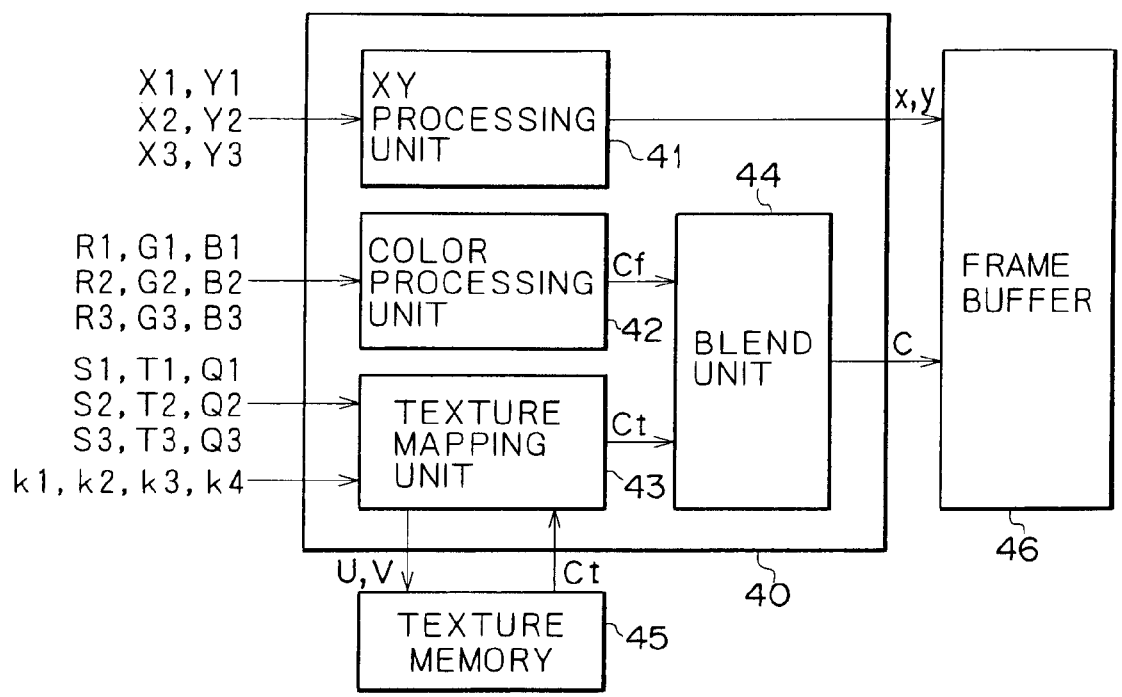
FIG. 4 is a schematic diagram showing the configuration of a rendering apparatus employing a texture mapping unit provided by the present invention.
Figure 5:
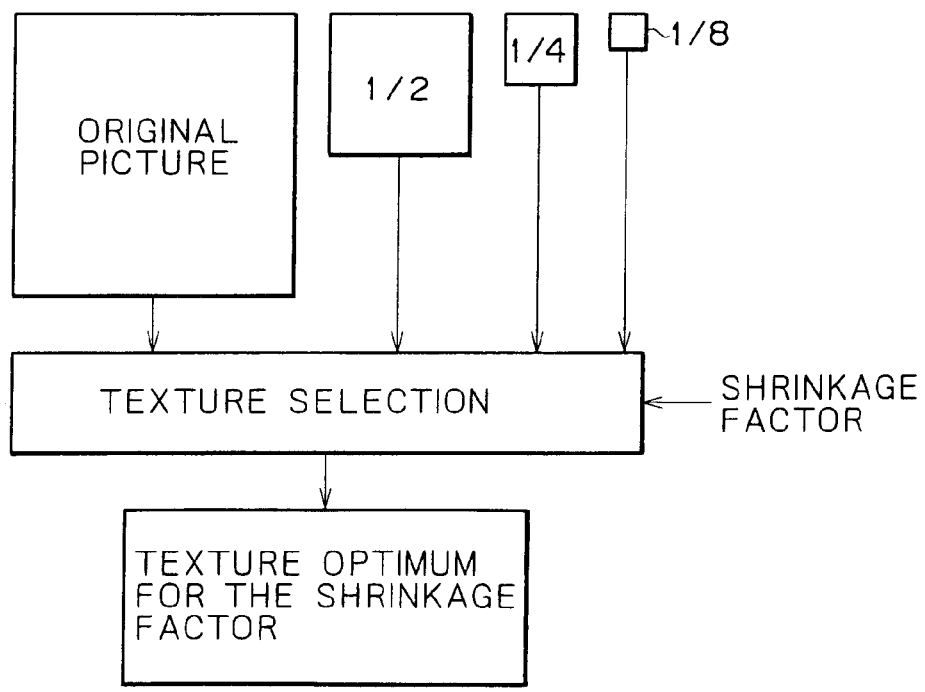
FIG. 5 is a diagram used for explaining the principle of MIPMAP filtering.
Figure 6A:
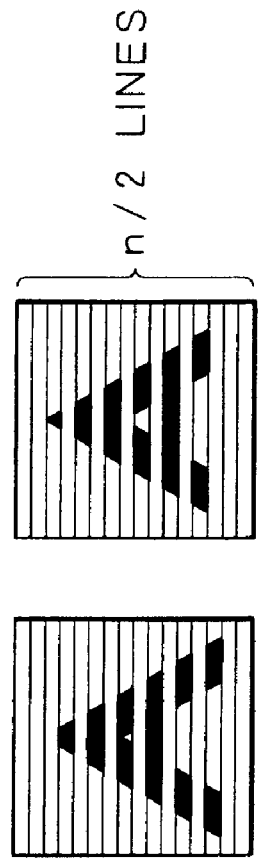
FIGS. 6A and 6B are explanatory diagrams used for describing interlace rendering.
Figure 6B:
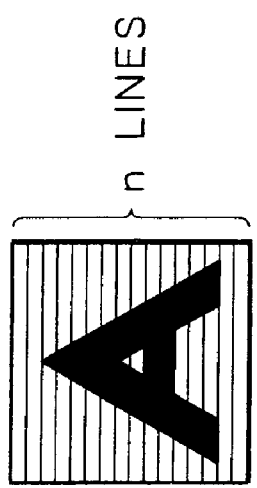

The following description explains a typical method of generating an address used for referring to a texture stored in a texture memory 45 shown in FIG. 4 by using the shrinkage factor lod computed as described above. As texture data, textures for different lod values are stored in the texture memory 45. These pieces of texture data are data of shrunk pictures which are used in a MIPMAP filtering process explained by referring to FIG. 5. The data has aliasing already removed by a filter.

In FIG. 3, symbols Tw and Th denote the width and the height of a texture. Notations ubase (lod) and vbase (lod) are base addresses of a texture for a shrinkage factor lod in the U-axis and V-axis directions, respectively. Let symbols u and v denote relative addresses. In this case, the absolute addresses U and V of a texture are given by Eqs. 8 below.

$$u = (s/q) \cdot Tw$$

$$v = (t/q) \cdot Th$$

$$U = ubase(lod) + \frac{1}{2}^{lod} \cdot u$$

$$V = vbase(lod) + \frac{1}{2}^{lod} \cdot v \quad (8)$$

As described above, in a texture mapping process, the MIPMAP filtering process can be carried out by controlling the magnitude of the shrinkage factor. The generation of an excessively fading picture in a perspective projection biased in the horizontal and/or vertical direction can thus be suppressed to thereby produce a picture with a high quality.

FIG. 4 is a diagram showing a rendering unit 40 employing a texture mapping unit 43 provided by the present invention. As shown in the figure, the rendering unit 40 comprises an XY processing unit 41 for carrying out processing related to the XY coordinate system 81, a color processing unit 42 for carrying out processing of color values (R, G and B), a texture mapping unit 43 for carrying out processing of texture coordinates (S, T and Q), and a blend unit 44 for carrying out processing on outputs of the color processing unit 42 and the texture mapping unit 43 to generate a new color. The rendering unit 40 is connected to a texture memory 45 for storing texture data and to a frame buffer 46 for storing rendered data to be output to a display unit.

The XY processing unit 41 generates XY coordinates (x, y) of a pixel inside a triangle. The color processing unit 42 finds a color value Cf of a pixel inside a triangle by linear interpolation of the color values (R, G and B) of the three vertexes of the triangle and outputs the color value to the blend unit 44 at a stage following to the color processing unit 42.

The texture mapping unit 43 computes a shrinkage factor lod from the texture coordinates (S. T and Q) of the three vertexes of a triangle and the adjustment coefficients k1 to k4 for adjusting the shrinkage factor lod, generating a texture address (u, v) based on the lod. The texture mapping unit 43 then refers to data Ct of a texture stored in the texture memory 45 at the address (u, v) and outputs the data Ct to the blend unit 44 at the following stage.

The blend unit 44 carries out processing such as additions and multiplications on the color value Cf received from the color processing unit 42 and the texture data Ct received from the texture mapping unit 43 to generate a new color C. The XY processing unit 41, the color processing unit 42, the texture mapping unit 43 and the blend unit 44 which compose the rendering unit 40 carry out their respective pieces of processing for each pixel, writing a color value C for the pixel into the frame buffer 46 at the XY coordinates (x, y) generated by the XY processing unit 41.

The rendering unit 40 is capable of carrying out a MIP-MAP filtering process by controlling the magnitude of the shrinkage factor in the texture-mapping operation. The rendering unit 40 thus offers a merit that generation of an excessively fading picture in a perspective projection biased in the horizontal and/or vertical direction can be suppressed to thereby produce a picture with a high quality.

The XY processing unit 41, the color processing unit 42, the texture mapping unit 43 and the blend unit 44 which compose the rendering unit 40 can also be implemented by a software control means comprising a CPU and a semiconductor memory which are not shown in the figure. It is also needless to say that the rendering unit 40 can be included in an information processing apparatus which also carries out graphic processing to be used in processing and display operations of figures.

As described above, in a texture mapping unit implemented by an embodiment, it is possible to carry out a MIPMAP filtering process by finely controlling the magnitude of the shrinkage factor to a value optimum for a picture being generated. A rendering unit employing the texture mapping unit thus offers a merit that generation of an excessively fading picture in a perspective projection biased in the horizontal and/or vertical direction can be suppressed and thereby producing a picture with a high quality. As a result, by including the texture mapping unit in the rendering unit, a high-quality picture can be generated. In addition, by including the rendering unit in an information processing apparatus, it is possible to display a picture with a high quality.

While the preferred embodiments have been described using specific terms, such description is for illustrative purposes only, and it is to be understood that changes and variations may be made without departing from the spirit or scope of the following claims.

What is claimed is:

1. A picture processing apparatus wherein a plurality of 2-dimensional pictures with shrinkage factors different from each other are stored in a memory, one of said 2-dimensional pictures is selected from said memory in accordance with contents of a multidimensional figure to be pasted on said multidimensional figure and said multidimensional figure with said selected 2-dimensional picture pasted thereon is mapped onto a first 2-dimensional coordinate system, said picture processing apparatus comprising:

a displacement computing means for computing a plurality of displacements of said 2-dimensional picture on a second 2-dimensional coordinate system prescribing said 2-dimensional picture from multidimensional coordinates of a point inside a polygon constituting said multidimensional figure and a plurality of unit displacements of said point inside said polygon on said first 2-dimensional coordinate system onto which said polygon is mapped;

a displacement adjusting means for adjusting said computed displacements of said 2-dimensional picture independently of each other by multiplying said computed displacements by coefficients to determine a plurality of adjusted displacements; and a shrinkage-factor computing means for computing a lod associated with a shrinkage factor of said 2-dimensional picture to be pasted on said multidimensional figure from said adjusted displacements of said 2-dimensional picture.

2. A picture processing apparatus according to claim 1, wherein said displacement computing means, said displacement adjusting means and said shrinkage-factor computing means are implemented by a software control means comprising a CPU, a memory unit and a program.

3. A picture processing apparatus according to claim 1, wherein:

$lod = \log_2(e_2)$ where $e_2 = \max(ex_2, ey_2)$ $ex_2 = \{((dudx)_2)^2 + ((dvdx)_2)^2\}^{1/2}$ $ey_2 = \{((dudy)_2)^2 + ((dvdy)_2)^2\}^{1/2}$, and $(dudx)_2, (dvdx)_2, (dudy)_2$ and $(dvdy)_2$ are the adjusted displacements.

4. The picture processing apparatus of claim 3 further comprising address computing means for determining an absolute texture address (U, V) for referring to a texture stored in said memory based on the computed shrinkage factor lod, wherein:

$U = \text{ubase}(lod) + (\frac{1}{2}^{lod}) \times u$ and $V = \text{vbase}(lod) + (\frac{1}{2}^{lod}) \times v$;

where U and V are an absolute address at which said 2-dimensional picture is stored in said memory, u and v are relative coordinates of said 2-dimensional picture on said second 2-dimensional coordinate system and ubase (lod) and vbase (lod) are coordinates of the origin on said second 2-dimensional coordinate system of said 2-dimensional picture, wherein said relative coordinates u and v are found from a length Tw of said 2-dimensional picture in said U-axis direction, a length Th of said 2-dimensional picture in said V-axis direction and multidimensional coordinates of said multidimensional figure.

5. A picture processing method by which a plurality of 2-dimensional pictures with shrinkage factors different from each other are stored in a memory, one of said 2-dimensional pictures is selected from said memory in accordance with contents of a multidimensional figure to be pasted on said multidimensional figure and said multidimensional figure with said selected 2-dimensional picture pasted thereon is mapped onto a first 2-dimensional coordinate system, said picture processing method comprising the steps of:

computing a plurality of displacements of said 2-dimensional picture on a second 2-dimensional coordinate system prescribing said 2-dimensional picture from multidimensional coordinates of a point inside a polygon constituting said multidimensional figure and a plurality of unit displacements of said point inside said polygon on said first 2-dimensional coordinate system onto which said polygon is mapped;

adjusting said computed displacements of said 2-dimensional picture independently of each other by multiplying said computed displacements by coefficients to determine a plurality of adjusted displacements; and computing a lod associated with a shrinkage factor of said 2-dimensional picture to be pasted on said multidimensional figure from said adjusted displacements of said 2-dimensional picture.

6. A picture processing method according to claim 5, wherein said steps are executed by a software control means comprising a CPU, a memory unit and a program.

7. A picture processing method according to claim 5, wherein:

$lod = \log_2(e_2)$
where $e_2 = \max(ex_2, ey_2)$
$ex_2 = \{((dudx)_2)^2 + ((dvdx)_2)^2\}^{1/2}$
$ey_2 = \{((dudy)_2)^2 + ((dvdy)_2)^2\}^{1/2}$, and
$(dudx)_2$, $(dvdx)_2$, $(dudy)_2$ and $(dvdy)_2$ are the adjusted displacements.

8. The picture processing method of claim 7 further comprising determining an absolute texture address (U, V) for referring to a texture stored in said memory based on the computed shrinkage factor lod, wherein:

$$U = \text{ubase}(lod) + (\tfrac{1}{2}^{lod}) \times u \text{ and}$$

$$V = \text{vbase}(lod) + (\tfrac{1}{2}_{lod}) \times v;$$

where U and V are an absolute address at which said 2-dimensional picture is stored in said memory, u and v are relative coordinates of said 2-dimensional picture on said second 2-dimensional coordinate system and ubase (lod) and vbase (lod) are coordinates of the origin on said second 2-dimensional coordinate system of said 2-dimensional picture, wherein said relative coordinates u and v are found from a length Tw of said 2-dimensional picture in said U-axis direction, a length Th of said 2-dimensional picture in said V-axis direction and multidimensional coordinates of said multidimensional figure.

* * * * *

UNITED STATES PATENT AND TRADEMARK OFFICE
CERTIFICATE OF CORRECTION

PATENT NO. : 6,476,819 B1
DATED : November 5, 2002
INVENTOR(S) : Hiroyuki Ozawa

It is certified that error appears in the above-identified patent and that said Letters Patent is hereby corrected as shown below:

Column 2,
Line 17, after "81", start new paragraph with -- dudx --.

Figure 7A:
FIGS. 7A and 7B are explanatory diagrams used for describing a picture in a perspective projection biased in the horizontal and/or vertical direction.
Figure 7B:
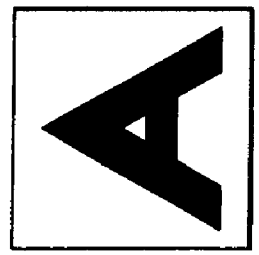
Figure 8A:
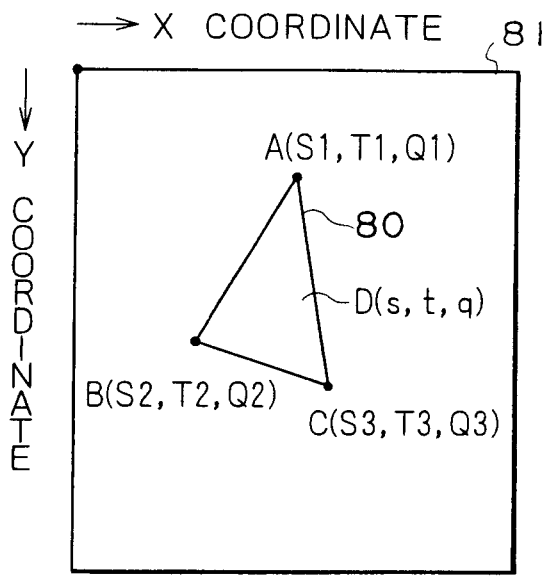
FIGS. 8A and 8B are explanatory diagrams used for describing a general principle of texture mapping.
Figure 8B:
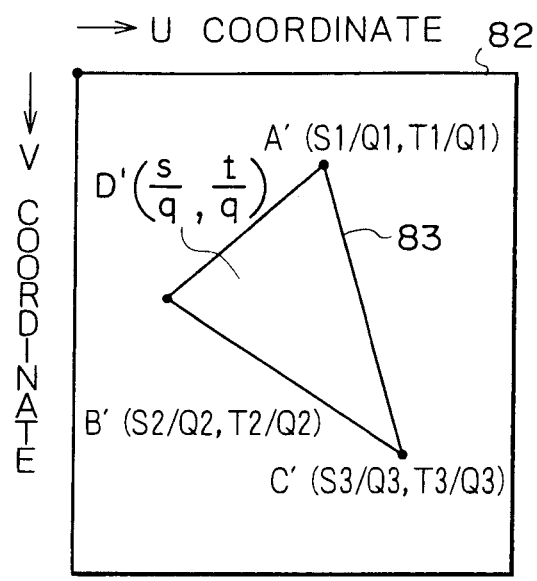
Figure 9A:
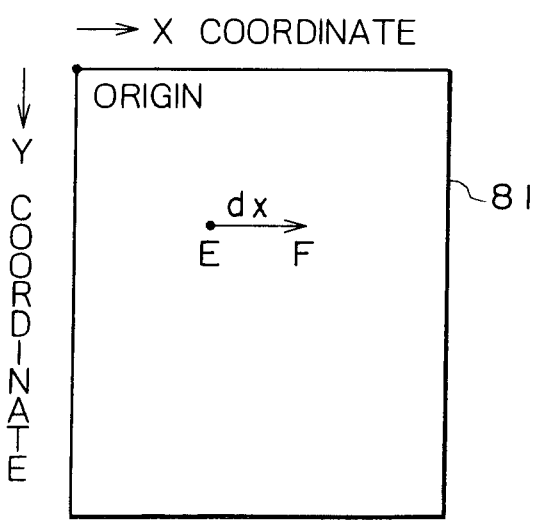
FIGS. 9A and 9B are explanatory diagrams used for describing another general principle of texture mapping.
Figure 9B:
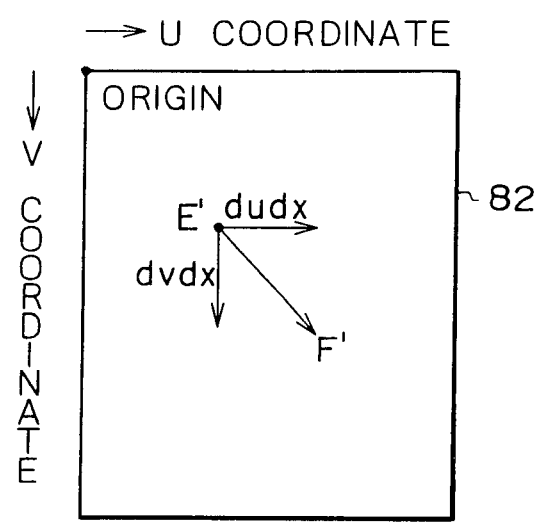

Column 4,
Line 11, after "FIG. 7A.", delete ";and".

Column 6,
Line 54, after "direction:", add new line as follows: -- dudx= (t·dqdx-q·dtdx) / q·q --.

Signed and Sealed this

Eighteenth Day of March, 2003

JAMES E. ROGAN
*Director of the United States Patent and Trademark Office*